April 19, 1932. J. V. CAPUTO 1,854,924
WELDING ROLL
Filed Aug. 29, 1930

INVENTOR
James V. Caputo
by his attorneys
Byrnes, Stebbins, Parmelee & Blenko

Patented Apr. 19, 1932

1,854,924

UNITED STATES PATENT OFFICE

JAMES V. CAPUTO, OF GIRARD, OHIO

WELDING ROLL

Application filed August 29, 1930. Serial No. 478,610.

My invention relates to welding and, in particular, to continuous electric welding as produced by the resistance method. In the prior art there are disclosed numerous methods and devices for continuously welding together the edges of a seam cleft in a cylindrical tube formed continuously from a flat strip. While the disclosures of this art relate principally to thin gauge tubing of small sizes, I have invented means for obtaining similar advantages in the manufacture of large-size heavy-wall pipe, which are disclosed in my co-pending application, Serial No. 475,174, filed August 14, 1930, for Electric welding machine. In the welding of large size pipe, it is necessary to employ currents of great magnitude. The larger dimensions of the pipe, furthermore, tend to magnify the difficulties encountered in the continuous welding of thin gauge material. One of the difficulties that has been encountered heretofore is the tendency of the welding current to be shunted around the solid portion of the formed tube without passing across the seam.

It is common practice to supply welding current to the edges of the seam by a pair of electrode rolls rigidly secured together but insulated from each other. The rolls engage the edges of the seam cleft and the current passing thereacross heats the edges to the welding temperature. A low resistance path for a welding current in parallel with that across the seam is provided by the solid continuous section of the formed tube. This parallel path shunts a portion of the welding current from the seam where the high temperature is desired to the solid section of the pipe where it is not wanted. This shunting of the welding current results in undesirable heating of the tube at portions other than the seam cleft. An extra load is also placed upon the current supplying equipment which produces no useful result.

This condition is aggravated because the pressure rolls which are employed to force the edges of the seam cleft together for welding, engage the pipe in substantially the same plane as the current supplying electrode rolls. The framework of the pressure rolls thus supplies a further parallel path for the welding current, which increases the difficulty hereinabove described.

Another objectionable result of the current shunted around the solid section of the pipe without passing across the seam is that it induces corresponding currents in the pressure rolls. These currents not only tend to heat the pressure rolls unnecessarily but, by transformer action lessen the reactance of the shunting current path in the pipe so that still more shunting current flows.

I have avoided the difficulties above mentioned by providing a side pressure roll for a continuous welding machine, which is made up of a plurality of laminations. I also insulate the laminated rolls from the frame in which they are mounted for cooperation with a rotary drive. The provision of laminated rolls increases the reactance opposing the flow of shunted circulating current and, at the same time, prevents the flow of induced or eddy currents in the roll itself. The insulation prevents the circulation of current through the pressure roll frame.

In order to insure that the roll grips the pipe firmly, I provide roll faces with a slight recess intermediate the ends of the rolls.

For a complete understanding of the invention, reference is made to the accompanying drawings in which.

Figure 1:
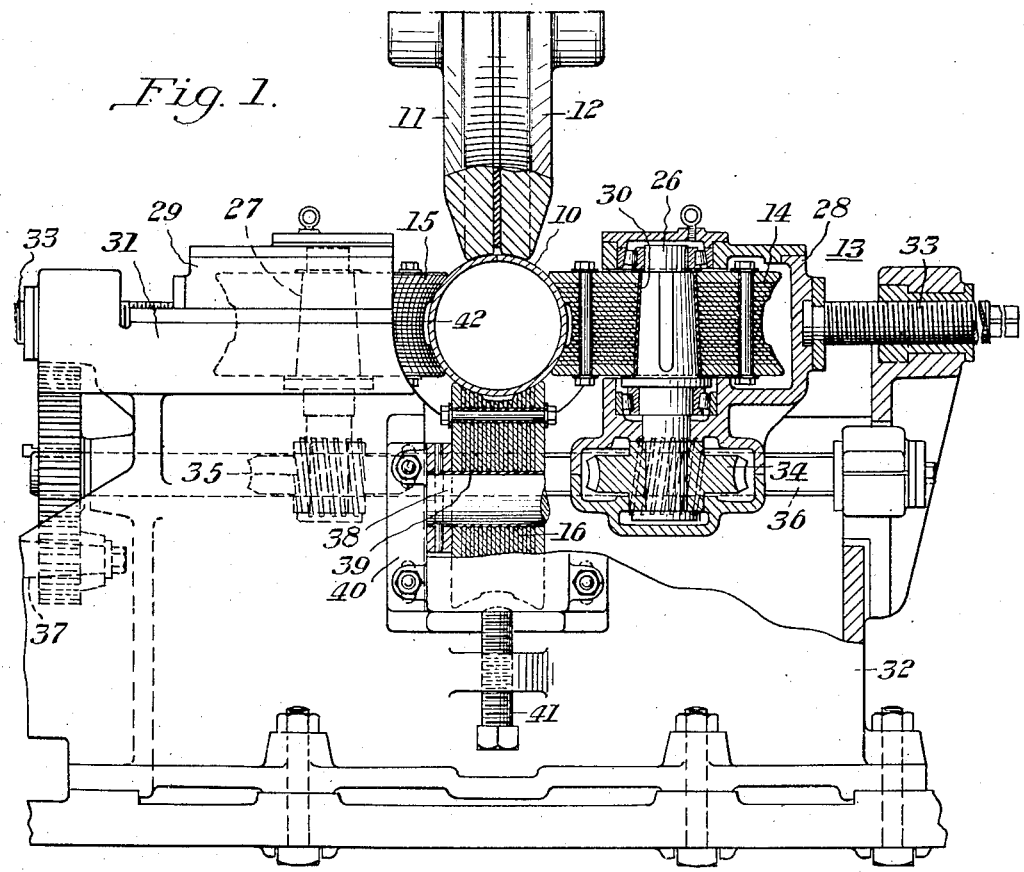
Figure 1 is a partial side elevation of the pressure roll stand of a continuous electric welding machine, part being shown in section.
Figure 2:
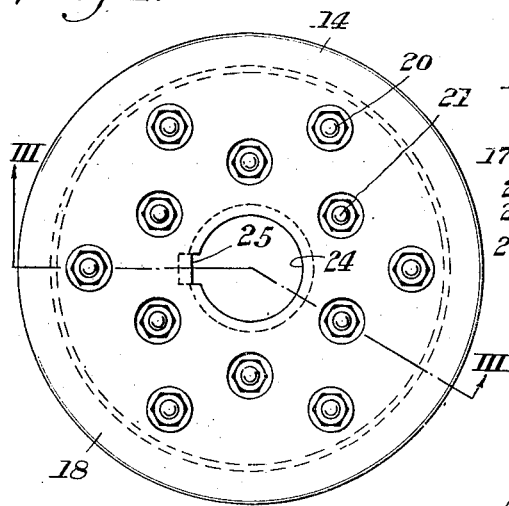
Figure 2 is a side elevation of one of the laminated rolls.
Figure 3:
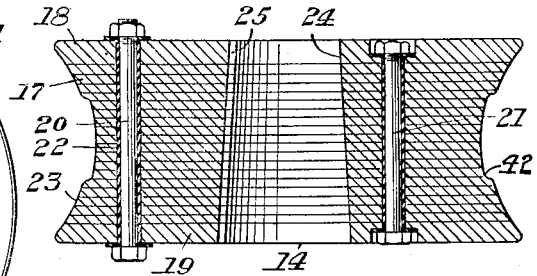
Figure 3 is a section on the line III—III of Figure 2.

Referring in detail to the drawings, a pipe 10 is formed from a flat plate of skelp and positioned so that the abutting edges thereof are adapted to be engaged by electrode rolls 11 and 12, while the pipe is passed through a pressure roll stand 13 comprising side rolls 14 and 15 and a lower support roll 16. The electrode rolls 11 and 12 are suitably supported for rotation above the pressure rolls 14 and 15. As will be apparent from Figure 1, the welding current flowing, say, from the roll 11 toward the roll 12 may traverse a path directly across the seam cleft in the pipe or may pass around the solid section of the pipe without crossing the seam. Since it is only the current that crosses the seam which raises it to welding temperature, it is desirable to limit the shunting current as much as possible.

The rolls 14 and 15 must have intimate contact with the pipe 10 so as to exert lateral pressure thereon and must be of long wearing material. Solid steel rolls have been employed in the past but these rolls permitted the circulation of large shunting currents through the solid section of the pipe 10.

In order to avoid this characteristic of solid steel rolls, the frame has rolls 14, 15 and 16 formed from a plurality of laminations 17 punched from thin steel sheets such as are employed in building up transformer cores. The laminations 17 are secured together with end plates 18 and 19. A series of bolts 20 and 21 hold the end plates and laminations together. The bolts are preferably insulated from the laminations by insulating bushings 22. As is well known, the usual oxide and lacquer coats on transformer sheets serve to insulate them from each other. After the laminations and end plates have been assembled and bolted together, the pipe engaging groove 23 is turned in the face of the roll and a tapered bore 24 having a key slot 25 is provided.

The rolls 14 and 15 are keyed on shafts 26 and 27 which are rotatably journaled in roll housings 28 and 29. An insulating bushing 30 separates the rolls from their supporting shafts.

The housings 28 and 29 are slidably supported in a frame 31 resting on a base 32. Adjusting screws 33 permit the housings to be advanced toward or retracted from the axis of the pipe 10. The housings carry worm wheels 34 and worms 35. The latter have sliding engagement with a square shaft 36 driven from any suitable power source 37. The side rolls 14 and 15 thus serve to advance the pipe through the welder as well as to force the edges of the seam cleft together.

The lower supporting roll 16 is similar in construction to the rolls 14 and 15. It is keyed on a shaft 38 and separated therefrom by an insulating bushing 39. The shaft 38 is journaled in a vertically adjustable housing 40 and an adjusting screw 41 is provided for raising or lowering the housing.

The mechanical details of the pressure roll stand 13 have been described in full in my co-pending application referred to on page 1 and only so much of the description contained therein as is necessary for a complete understanding of the present invention is repeated here.

The rolls 14, 15 and 16 are each provided with an annular recess 42 so that the edges of the roll will firmly engage and grip the curved surface of the pipe.

It will be obvious that the laminated roll illustrated and described is characterized by a greater reactance opposing the flow of shunting current than would be the case in the solid roll. The reactance opposing the flow of shunting current in the pipe, of course, depends on the reluctance of the magnetic circuit in the material adjacent the current path. Since the roll is laminated in a plane perpendicular to the tangent to the pipe at the point at which the roll engages therewith, current tending to traverse the shunting path through the solid pipe section induces a large amount of flux in the laminations of the roll. This flux opposes the flow of current through the shunting path. In a solid roll, currents are induced in the solid face of the roll in opposite directions to that in the pipe section by transformer action. The existence of these currents in the face of the roll lowers the reactance opposing the flow of circulating current, with the result that still more current is shunted around the pipe. Since the laminations of the rolls are insulated from each other, no current can traverse the roll face as the result of induction by the current in the shunting path.

I have thus reduced the amount of shunting current in two ways, first by increasing the reactance opposing the flow of shunting current, and second by preventing the flow of induced currents in the roll face which would tend to permit larger circulating currents to flow in the pipe.

The insulation of the rolls from their shafts and the supporting frames, furthermore, prevents any circulating current from traversing the bearing or frame structure. The circulating current is thus further reduced and the result is that substantially all of the current supplied to the pipe from the rolls 11 and 12 crosses the seam cleft in the pipe 10 to raise the temperature of the edges thereof to the welding point. All unnecessary heating of the body of the pipe and the faces of the pressure rolls by the circulation of shunting currents is eliminated.

Although I have illustrated and described herein but one present preferred embodiment of the invention, it is obvious that other constructions may be resorted to within the scope of the following claims without departing from the spirit of the invention or sacrificing the advantageous characteristics thereof.

I claim:

1. The combination, in a welding machine, with electrode rolls for supplying welding current to the edges of a seam cleft of a formed pipe, of laminated metal rolls for engaging the pipe laterally to force the edges of the cleft together.

2. In a welding machine, electrode rolls for supplying welding current to the edges of a seam cleft in a formed pipe, and a laminated metal roll for engaging the pipe laterally to effect a weld.

3. In an electric welder, means for supplying current to the edges of a seam cleft in a formed pipe and means for preventing the flow of current around the periphery of the pipe comprising laminated metal rolls engaging the pipe.

4. A work-engaging roll for a continuous electric welder, composed of stacked metal sheets.

5. A pressure roll for a continuous welder having a work engaging groove, said groove having a circumferential recess intermediate its edges.

6. In an electric welder, a plurality of rolls for engaging a pipe to be welded, said rolls being composed of metallic laminations for preventing the induction of current in the faces of said rolls by current circulating circumferentially of said pipe.

7. In a pipe welder, a pressure roll engaging the pipe, said roll comprising metallic laminations to limit the transformer effect of current circulating circumferentially of the pipe.

8. In a continuous electric resistance pipe welder, a roll for engaging the pipe, said roll comprising a plurality of metal laminations clamped together to form a flux path of low reluctance in a plane perpendicular to a vertical diameter of said pipe.

In testimony whereof I have hereunto set my hand.

JAMES V. CAPUTO.